April 22, 1930.  J. BIJUR  1,755,629
LIQUID DISTRIBUTING SYSTEM
Filed Dec. 4, 1929  2 Sheets-Sheet 1
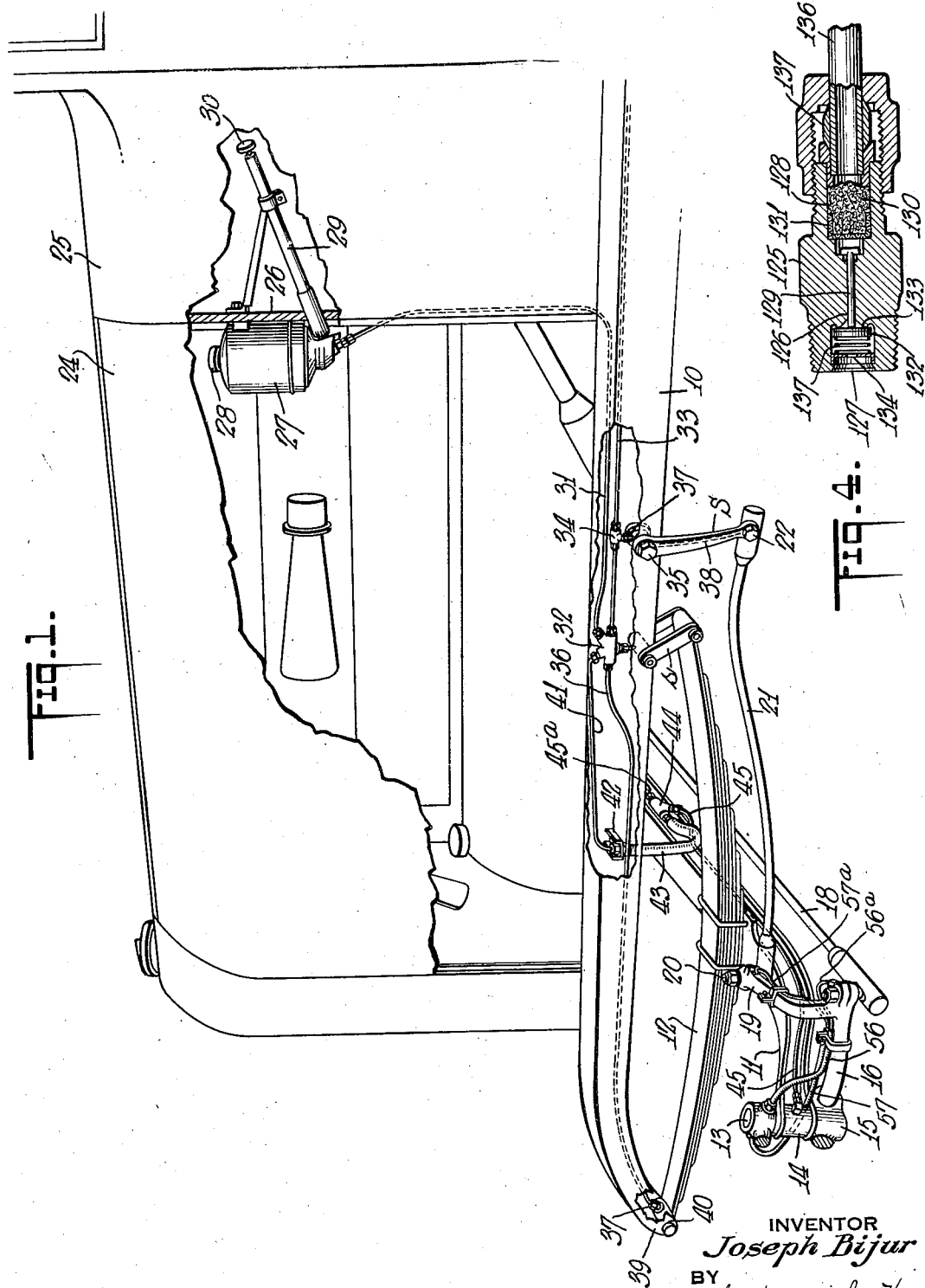
INVENTOR
Joseph Bijur
BY
Dean, Fairbank, Albright, & Hirsch
ATTORNEYS

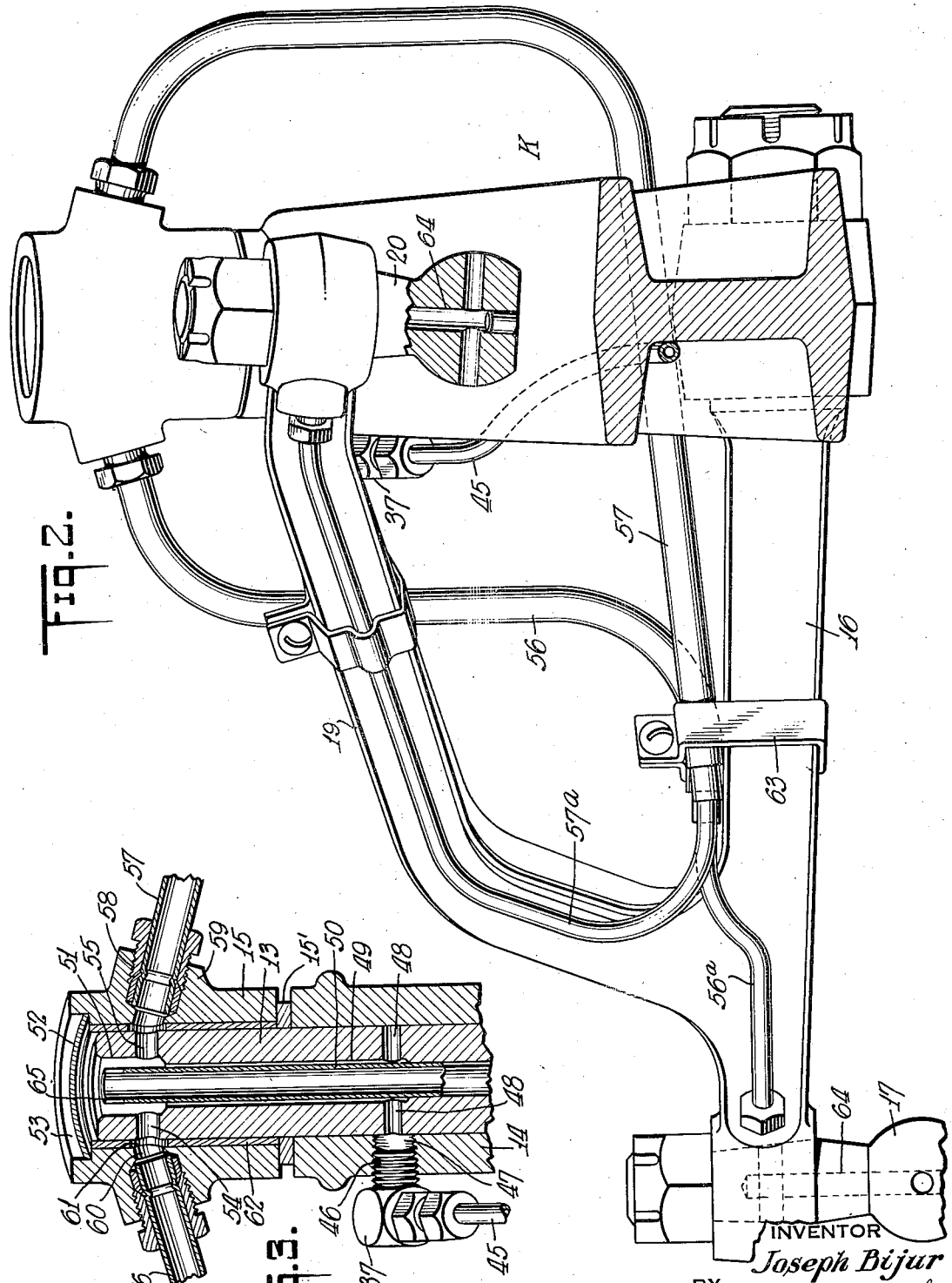

Patented Apr. 22, 1930

1,755,629

UNITED STATES PATENT OFFICE

JOSEPH BIJUR, OF NEW YORK, N. Y., ASSIGNOR TO AUTO RESEARCH CORPORATION, A CORPORATION OF DELAWARE

LIQUID-DISTRIBUTING SYSTEM

Application filed December 4, 1929. Serial No. 411,521.

My present invention is primarily concerned with centralized lubricating systems and while of a wider range of application, is especially useful in chassis lubrication.

An object of the invention is to accomplish the lubrication of a mechanism or installation, some of the bearings of which are bodily movable relative to others, by resort to a simple, rugged conduit system, effecting prompt delivery of oil from a central source to each of the various bearings, and in accordance with the respective diverse requirements thereof, all without clogging or contamination by dirt in the course of flow.

In the specific application to chassis lubrication, various bearings on the chassis frame can be oiled from a central pressure system the outlets of which are disposed at those elements of the chassis bearings that are substantially stationary relative to the frame, such for instance, as the spring bolts and the frame ends of the spring shackles. As to the bearings on the steering knuckles, the brakes and other parts that may have a substantial bodily movement relative to the chassis frame, the use of lubricant tight swivels for transmission of lubricant pressure from the oil lines on the chassis frame, may involve the difficulty of leak on the one hand or binding of swivels on the other, while the use of pressure tight flexible conduits bridging from the frame to each of such bearings, involves the likelihood of injury of the exposed flexibles during use of the vehicle in traffic.

It is, accordingly, another object of the invention to provide a system by which the various bearings on the chassis frame or similar primary structure, may be reliably fed from a pressure distributing system, and in which prompt delivery and correct proportioning of lubricant to the various knuckle or other bearings or subsidiary structure, may be accomplished without the use of vulnerable pressure-tight flexibles or of pressure-tight swivels.

The result is accomplished according to my invention by the use of a combined or composite system, preferably including the main system, such as is claimed and shown in my prior Patent No. 1,632,771 of June 14, 1927, delivering to each of various bearings on the frame or main structure by way of drip plugs, each of appropriate rating, each of the knuckles or other subsidiary structures movable relative to the frame, being supplied from one of the drip plugs at an outlet of the main system, feeding, however, to a gravity flow line on the subsidiary structure, so designed as promptly to deliver oil to the respective bearings of said structure.

Each of those drip plugs that supplies a subsidiary structure is preferably disposed at the bearing support or mount of such structure. In the lubrication of a knuckle, for instance, the relatively fixed bearing of the knuckle swivel mount carries the knuckle feeding drip plug, such swivel mount is rendered dust-tight and, therefore, air-tight, while the conduits of the oil delivery system leading to the various bearings of the knuckle are of bore so large for the greater part of the volume thereof as to permit gravity flow of lubricant about any air imprisoned therein, thereby to avoid air blocking or stanching of flow and also to avoid siphoning from a higher to a lower bearing of such subsidiary structure.

Where the main pressure distributing pipe is arranged according to the specific teachings of my said prior patent, it is of bore so small as substantially to preclude the flow of lubricant about any air therein, so that the system from the pump to the various drip plugs is completely filled ordinarily, with lubricant and substantially all air is excluded. The gravity system of each of the various subsidiary structures, on the other hand, includes piping of larger bore and in which air is trapped, all preferably according to the teachings of my copending application, Serial No. 202,997 filed July 2, 1927, of which this application is a continuation in part.

In the embodiment of invention last referred to, the familiar principle of hydraulics is thus departed from, according to which relatively larger conduits serve to deliver the main flow of lubricant or other liquid and relatively smaller tail or distributing pipes tap from the main line of flow to the subsidiary bearings, for in the present case, the smaller bore conduits deliver the main flow and the larger bore conduits are taps or branches.

The invention may be more fully understood from the following description in connection with the accompanying drawings, wherein:

Fig. 1 is a fragmentary perspective view of the forward end of an automobile equipped with my improved lubricating system, part of the hood and cowl being shown broken away and part of the dashboard being shown in section for the sake of clearness, Fig. 2 is a greatly enlarged view mainly in elevation, but partly in section, showing one of the steering knuckles and its associated bearings, this view being taken in section through the axle and looking outwardly along the knuckle, Fig. 3 is an enlarged vertical sectional view through the knuckle showing the manner of lubricant division, and, Fig. 4 is a sectional view through one of the drip plugs.

Referring first to Fig. 1 of the drawings, there is shown, fragmentarily, the forward end of an automobile including the usual channeled chassis frame bar 10, supported on the front axle 11 by the spring 12. This axle is shown with eyes 14 at its ends in each of which a king pin 13 is fixed. Each knuckle clevis 15 has a pivot bearing mount on the king pin, and has a rearward projecting arm 16, which terminates in a ball stud 17 to which the transversely extending tie rod 18 is pivoted. Fixed upon the rear end of the steering arm 16 is the drag link arm 19 having a ball stud connection at 20 with the drag link 21, the rear end of which is pivotally connected at 22 to the steering arm S operated in usual manner (not shown) from the steering wheel of the car. As thus far described, the construction may be entirely conventional.

Various chassis bearings may be lubricated from a lubricant reservoir 27 having a normally closed filling neck 28, mounted upon the forward side of the dashboard 26 and a spring cylinder pump 29 having a handle 30 to permit manual charging thereof, is operatively connected to the lower end of the reservoir and extends through the dashboard to a point where it may be conveniently manipulated by the driver of the car. Reference may be had to my prior Patent No. 1,632,771, for details of reservoir and pump structures and the manner in which retraction of the pump handle 30 serves to charge the pump cylinder with oil and store energy in a discharging spring. Reference may also be had to said patent for the manner in which the pump, when released, is spring urged to discharging position, to force its charge of lubricant into the small bore distributing conduit 31, which in the present case may constitute the inlet of the pressure distributing conduit system.

As shown, conduit 31 of small bore copper tubing leads to a junction fitting 32, fixed upon the interior of the chassis frame bar 10. One of the pipe lines 33, from this fitting leads directly along the chassis frame bar to drip plugs at various bearings (not shown) at the rear end of the frame.

A T fitting 34, in this line, leads lubricant into the rock shaft 35 of the steering arm S. A drip plug 37 at the rock shaft inlet controls the emission of oil at this point to flow down a channel 38 (indicated by dotted lines) to lubricate the bearing 22 between the drag link and the steering arm.

From fitting 32 another small bore conduit 36, leads along the chassis frame bar and delivers lubricant through a drip plug fitting 37 to the swivel bearing 40 between the forward end of the spring 12 and the downwardly turned horn 39 at the front of the chassis frame bar. It will be readily understood that various small bore conduits, such as the conduits 31, 33, 36, etc. may be employed to deliver lubricant to other bearings on the chassis.

Another conduit 41 leads from the junction fitting 32 to an anchor fitting 42, secured upon the inner face of the chassis frame bar 10. At the anchor 42, the small bore conduit 41 is coupled in liquid-tight relationship to a bridging conduit adapted to convey lubricant from the frame to bearings on, or associated with, the front axle 11. This bridging conduit which may be of flexible hose has its delivery end coupled to a Y fitting 44 fixed upon the rear face of the axle 11 and small bore conduits 45, 45ª, lead from this Y fitting to the knuckle structure at the respective ends of the axle. While other constructions and mountings of bridging conduit may be used, it is preferred to employ the specific construction and arrangement disclosed and claimed in my copending case, Serial No. 396,304, filed Sept. 30, 1929.

In Fig. 4 is shown a desirable form of drip plug, the details of which need be but briefly described, as this element is not claimed herein, except as part of the system as a whole. The drip plug includes a body portion 125, threaded at one end to screw into the stationary part of a bearing and having a longitudinal bore 126 therein, communicating with sockets 127, 128 at opposite ends of the body. The bore 126 is substantially filled by a restriction pin 129. The socket 128 receives a filter wad 130 retained in a mesh basket 131 and guarding the crevice between pin 129 and bore 126 against scale which may be entrained from the walls of the conduits, by the oil stream entering through the small bore conduit 136 which is coupled to the body by a compression coupling indicated generally at 137.

In the outlet socket 127 is disposed a check valve 132 for coaction with an outwardly facing seat 133, this valve being tightly held against its seat by a coiled spring 137 reacting against a retainer cup 134 force-fitted into the socket mouth.

The specific drip plug construction is the subject matter of the copending application Serial No. 430,334, filed February 21, 1930.

Referring now to the subsidiary system for lubricating outlying bearings, such as those carried on the swivelled knuckle K, the pipe branch 45 leads to a drip plug 46, affixed in socket 47 (Fig. 3) in the axle eye. The socket communicates with a radial bore 48 in the king pin 13, the latter also being formed with a longitudinal bore 49 intersected by the radial bore 48. The bore 49 at its lower end is of somewhat reduced diameter to snugly accommodate a tubular restriction element 50 which cooperates with the upper portion of the bore to define an annular chamber of restricted cross-sectional area, in which the oil from the drip plug 46 accumulates. The oil after filling this chamber wells over into a socket 51, defined by the upper knuckle clevis and the top of the king pin, such socket being protected by a dust-tight cap 52 fitted into its enlarged upper end 53.

From the socket 51 mechanical division of the oil is effected to assure correct distribution to the steering arm ball stud 17 and the drag link ball stud 20 which are located at lower level. Part of the oil from the socket 51, flows in two directions through diametrically opposed radial ports 54 and 55 into conduits 56 and 57. The inlet ends of these conduits are coupled in any suitable manner, as at 58, to sockets formed in diametrically opposite bosses 59 on the upper knuckle clevis. The reduced inner ends 60 of these sockets communicate through openings 61 in the knuckle clevis bushing 62 with the ports 54 and 55. The registering ports or openings 54, 55, 61 and 60 are of such a size as to permit partial registration during normal steering movements. The lower ends of the pipes 56 and 57 may be secured by a common bracket 63 to the steering arm 16 and in the region of this bracket the respective pipes 56 and 57 are coupled to small diameter conduits 56ª, 57ª leading along the frame structure to the ball studs to be lubricated and delivering into suitable lubricant bores indicated at 64.

The upper knuckle-clevis bearing is adequately lubricated by a slight leakage of oil between the king pin and the upper clevis bushing, as the oil bridges the cracks between these elements in flowing into pipes 56 and 57. A washer or gasket 15' seals the lower end of said bushing. The lower knuckle clevis bearing may receive oil which wells over from the socket 51 through notches 65 in the top of the member 50, flows downwardly through the member 50, and escapes through a suitable radial outlet (not shown) at the lower knuckle clevis. No specific claim is herein made to the details of construction of the illustrative knuckle lubricating arrangement shown, as said feature taken by itself is the subject matter of my copending divisional application Serial No. 429,539, filed February 19, 1930.

With this general form of construction, which merely typifies one of the numerous instrumentalities for effecting lubrication of the steering knuckle and associated bearings, it will be noted that the oil is to jump or bridge one or more crevices only after it has escaped from the drip plug 46 and is no longer under pressure. Beyond the drip plug 46 the oil flow and the oil distribution is entirely by gravity, or displacement. Since the oil is under no pressure as it bridges the swivel between bushing 61 and the king pin 13 only enough oil will leak into this crack to insure adequate lubrication of the clevis bearing.

As in the case of my prior Patent No. 1,632,771, the main pipe system from the pump to the various drip plugs, is of bore preferably in the order of ⅛" in diameter or less, which can readily be bent about obstructions on the chassis, and which will not permit oil of the range of viscosities usually employed for chassis lubrication, to flow about any air therein. The drip plugs being so constructed and arranged as not to drip when there is no pressure on the line, the pipe system at all times remains completely filled with oil throughout the length, from the pump to each of the various drip plugs. The knuckles K, steering arm S or other subsidiary structure are movable relative to the main structure and each carries one or more bearings, which during use are bodily displaced through a substantial range, relative to the main frame. A drip plug on the main system is disposed adjacent the mount of each of the subsidiary structures and delivers lubricant thereto. Although the drip plug absorbs the oil pressure on its way to these subsidiary structures, and though the passages of such structure are sealed at their upper ends, and oil-sealed at the small outlets 64, feed by gravity flow occurs as promptly and as reliably as if the passages were vented.

In the knuckle construction, the pipes 56 and 57 are preferably of fairly large bore, ¼" or more in diameter, and the pipe or conduit 38 along steering arm S also is of large bore of ¼" or more although as pointed out in the copending application Serial No. 202,997 above referred to, the pipe bore may be ₁₆⁄₃ inch in diameter where oil of the grade of ordinary engine oil is used. Thus, notwithstanding the lack of venting, the successive small charges of oil from the drip plugs will rapidly trickle down these pipes, without displacing the air therein, and will reach the bearings without stanching of flow or air-blocking. Oil siphoning from a higher to a lower bearing, from the drag link to the tie rod bearing, for instance, is also avoided, inasmuch as under the slow feed from the drip plugs, the pipes can never fill with oil, which is a pre-requisite to siphoning.

While a specific arrangement of small main and large subsidiary conduits has been disclosed, the invention is by no means limited to the details illustrated, but is concerned more broadly with a pressure distributing system, one or more of the pressure absorbing outlets of which feeds a subsidiary relatively moving bearing-carrying structure equipped with a conduit system feeding by gravity.

While the invention is shown applied to systems embodying a manually charged spring-discharged pump, the system in its broader aspects is also applicable to continuous feed systems, for instance, as that of my prior Patent No. 1,732,212 of October 15, 1929.

While the invention in its broadest aspects may be applicable even to the lubrication of the lower bearing of a spring shackle such as shown at s on the drawings, the volume of the bore or feed pipe of such structure is generally so small that the invention presents less advantage in such application than it does in the relations specifically described.

The details of the steering arm S are not material to the invention claimed herein but may be and preferably are constructed substantially as shown in my copending application Serial No. 256,504, filed February 24, 1928.

I claim:—

1. A centralized liquid distributing system including a reservoir, a main conduit system deriving liquid from the reservoir and having invariant high flow resistance elements at its outlets, a subsidiary distributing system beyond one of said outlets including a plurality of distributing conduits each receiving predetermined proportions of the liquid escaping from said outlet, the main conduit system including conduits of sufficiently small diameter to substantially preclude the passage of liquid around gases entrapped therein, so that they provide substantially incompressible liquid columns, the subsidiary conduit system including conduits having portions of sufficiently large bore to permit liquid flow about the gases therein, and means to apply pressure to the liquid in the main conduit system.

2. An installation for supplying liquid in predetermined proportions to a plurality of relatively isolated delivery points and to a plurality of relatively contiguous delivery points, said installation comprising a liquid filled small bore distributing conduit system having outlet fittings of invariant high flow resistance, certain of which control flow to the isolated delivery points, a pump for forcing liquid into the system, and a system of large bore gravity flow pipes connected to be supplied from one of said fittings, said subsidiary large bore system delivering to said contiguous delivery points.

3. An installation for supplying liquid in predetermined proportions to a plurality of relatively isolated delivery points and to a plurality of relatively contiguous delivery points, said installation comprising a liquid filled small bore distributing conduit system having outlet fittings of invariant high flow resistance, certain of which control flow to the isolated delivery points, a pump for forcing liquid into the system, a system of large bore gravity flow pipes connected to be supplied from one of said fittings, said subsidiary large bore system delivering to said contiguous delivery points, and having its conduits of sufficient cross-sectional area to preclude siphoning between such points the main small bore system being of diameter so small as to prevent the passage of liquid around any air bubbles therein, whereby the main system is normally filled with an incompressible liquid and a substantial portion of the branch system conduits is filled with air.

4. A centralized chassis lubricating system including an oil reservoir and a pump, a distributing conduit system into which oil under pressure is forced by the pump, said system including main conduits of bore sufficiently small substantially to hinder the passage of oil around any air therein, flow controlling outlet fittings for said system of high flow resistance, a branch conduit beyond and supplied by one of said fittings and adapted to convey oil and including a portion of sufficient diameter to permit the free passage of oil about the air which may be entrapped in it.

5. A centralized lubricating system including a reservoir and pump, a distributing conduit system supplied by the pump and including a plurality of supply conduit lines leading to bearings to be lubricated, certain of said conduits being pressure-tight and one of said conduits passing across parts movable relatively to each other and defining a leakage crevice, said last mentioned conduit being adapted to convey lubricant to bearings beyond said crevice, flow controlling fittings of invariant high flow resistance, arranged at the outlets of the pressure-tight conduits and a similar fitting arranged in said one conduit in advance of said crevice, said conduit beyond the fitting serving to convey lubricant by gravity flow.

6. The combination with an automotive vehicle including a main chassis frame having a plurality of bearings thereon, an axle upon which said frame is movably supported and knuckles on the ends of said axle, of a centralized lubricating system for delivering correctly proportioned amounts of oil to all of said bearings, said system including a reservoir on the chassis frame, a system of small bore pressure-tight distributing conduits on the main frame having flow controlling outlets of high flow resistance adjacent the main frame bearings to be lubricated, a pump deriving oil from the reservoir and forcing it into the liquid filled small bore system, a bridging conduit from the main frame to the axle, said conduit forming part of said system and being arranged to accommodate relative movement of the main frame and axle, a conduit along the axle and supplied beteween its ends from the outlet of said bridging conduit, flow controlling outlets of high flow resistance at the ends of said axles, delivering from the ends of said axle conduit to said knuckles, each of said knuckles having a conduit system, substantially sealed at its inlet and outlet ends from the air and of bore so large as to permit flow of lubricant about any air therein.

7. A centralized distributing installation including an inter-communicating system of liquid filled pressure mains, means to force liquid into said system, pressure absorbing flow proportioning means controlling the emission of liquid from said system, a subsidiary feed system fed by one of said mains, said system including a lubricant supply cavity at higher level, a bearing at lower level, a conduit communicating with said cavity to supply said bearing, but being otherwise substantially sealed against the entry of air, said conduit being constructed and arranged to prevent the exertion of suction upon the cavity due to the weight in the conduit of lubricant from said cavity.

8. A centralized lubricating system for a vehicle chassis including a pivoted subsidiary structure, said system including a source of oil and of pressure, a distributing conduit system, said system including main conduits of bore sufficiently small, substantially to hinder the passage of oil around any air therein, flow controlling fittings for said system, of high flow resistance, one of said outlet fittings being disposed at the pivot mount of said subsidiary structure, a lubricant conduit system carried by said subsidiary structure, and conveying lubricant by gravity flow across the pivot bearing of said structure and thence along said structure to a bearing thereof, said pivot mount being substantially air-tight, thereby precluding the venting of said conduit, the major part of the volume of said conduit being of bore so large as to permit the flow of lubricant about any air therein.

9. A centralized lubricating system for a chassis including a pivoted knuckle having a tie rod and a steering arm bearing, said system including a source of lubricant, a source of propulsive pressure, a distributing conduit system into which oil is forced thereby, said system including main conduits of bore sufficiently small substantially to hinder the passage of oil around any air therein, drip plug outlets for said system of high flow resistance, one of said outlets being disposed at the fixed axle mount of said knuckle, a conduit system carried by said knuckle and leading along the structure thereof to the respective tie rod and drag link bearings, said system having an inlet at the upper part of the knuckle pivot mount, said pivot mount being substantially air-tight, thereby precluding the venting of said conduit system, a substantial part of the length of said conduit being of bore so large as to permit the flow of lubricant about any air therein.

Signed at New York city, in the county of New York and State of New York, this 25th day of November, A. D. 1929.

JOSEPH BIJUR.